(No Model.) 2 Sheets—Sheet 1.
W. B. HAMMOND.
MACHINE FOR SAWING AND DRILLING METAL OR OTHER SUBSTANCES.
No. 421,027. Patented Feb. 11, 1890.
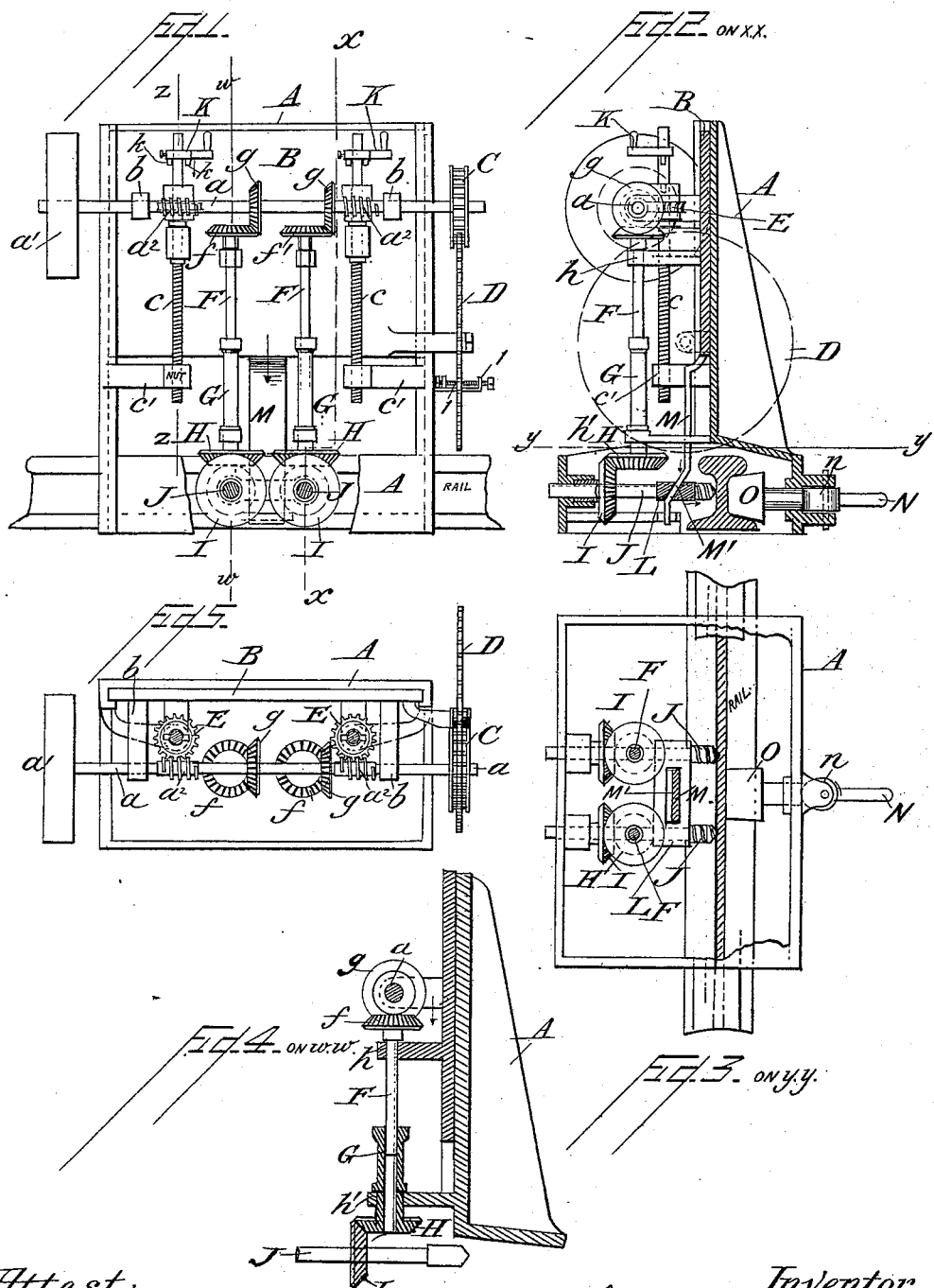
Attest:
F. H. Schott
Fred E. Tasker
Inventor
Wilberforce B. Hammond
per John C. Tasker, atty

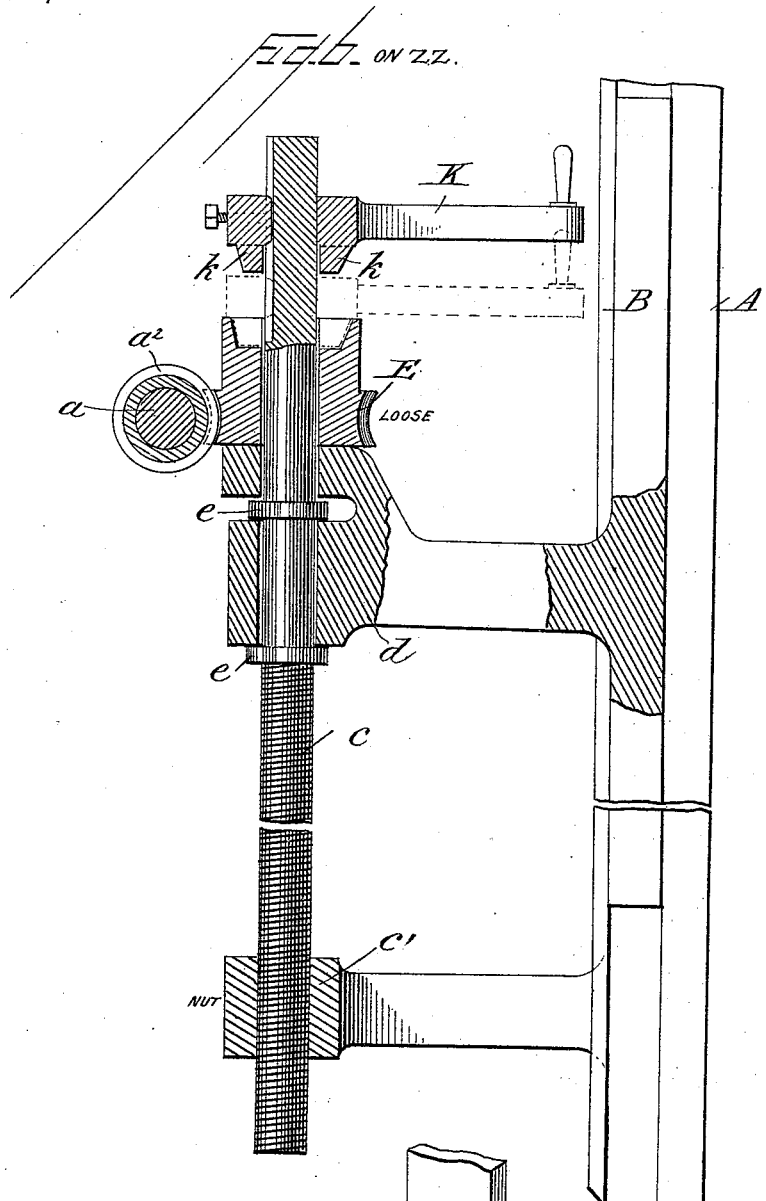
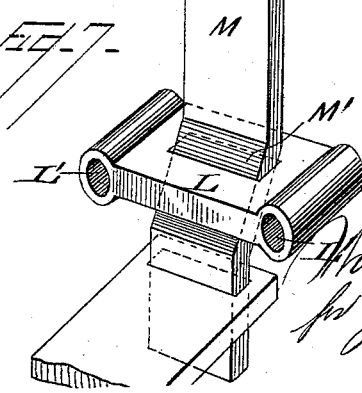

UNITED STATES PATENT OFFICE.

WILBERFORCE B. HAMMOND, OF BOSTON, MASSACHUSETTS.

MACHINE FOR SAWING AND DRILLING METAL OR OTHER SUBSTANCES.

SPECIFICATION forming part of Letters Patent No. 421,027, dated February 11, 1890.

Application filed May 11, 1889. Serial No. 310,422. (No model.)

*To all whom it may concern:*

Be it known that I, WILBERFORCE B. HAMMOND, a citizen of the United States, residing at Boston, in the county of Suffolk and State of Massachusetts, have invented certain new and useful Improvements in Machines for Sawing and Drilling Metal or other Substances; and I do hereby declare the following to be a full, clear, and exact description of the invention, such as will enable others skilled in the art to which it appertains to make and use the same.

This invention relates to an improvement in machines for sawing or cutting metals, wood, stone, ice, or other substances, it being particularly applicable for use in sawing and drilling railway-rails, the object of the invention being to provide a simple, cheap, and perfect machine of this class designed to be operated by power, but not constructed so that its operation by hand would be impossible; and the invention consists in the construction, arrangement, and combination of parts, substantially as will be hereinafter described and claimed.

In the accompanying drawings, illustrating my invention, Figure 1 is a front elevation of my improved machine for cutting metals and other substances. Fig. 2 is a vertical section of the same on line $x$ $x$ of Fig. 1. Fig. 3 is a horizontal section on the line $y$ $y$ of Fig. 2. Fig. 4 is a vertical section on line $w$ $w$ of Fig. 1. Fig. 5 is a top plan view. Fig. 6 is an enlarged vertical section on line $z$ $z$ of Fig. 1. Fig. 7 is an enlarged detail perspective view of the cam and wedge for feeding and retracting the drills.

Similar letters of reference designate corresponding parts throughout all the different figures.

A denotes the main frame of the machine, which is of any suitable and desirable form. In connection with it is arranged the vertical sliding plate B, adapted to move up and down in ways or grooves in the main frame.

The work to be operated upon is located in the bottom portion of the machine and is clamped by some suitable device, an example of which will be hereinafter described.

The sliding plate B carries a horizontal shaft $a$, journaled in bearings in the arms $b$ $b$, that project horizontally outward from said plate. The shaft $a$ is provided at one end with a pulley $a'$, which is adapted to be run by a horizontal belt applied thereto. Shaft $a$ has at its other end a saw-operating wheel C, which may be a trundle or lantern wheel like that shown in the drawings, although I am not restricted to that kind of wheel, but may use any other; and this saw-operating wheel so engages the saw D, whose arbor or axle is likewise carried by the sliding plate B, that the saw will be properly rotated so as to cut the work—such as, for instance, the railroad-rail placed transversely beneath it in the lower portion of the machine, as shown. Suitable devices, as the screw-studs $l$ $l$, are provided to keep the saw from buckling.

The sliding plate B is moved up or down by means of two or more vertical screws $c$, the lower ends of which pass through suitable nuts formed in the outer extremities of the horizontal arms $c'$, that project from the main frame A. The arrangement of the operating-screws $c$ $c$ is best shown in the enlarged sectional view of Fig. 6. Said screws pass through suitable arms $d$ $d$, that project from the sliding plate B, which arms are properly fashioned in the manner shown in Fig. 6 to receive the screws $c$ $c$. These screws are provided with collars $e$ $e$, one of which rests beneath the arm $d$, while the other is located within a slot in said arm. The screws $c$ $c$ are furthermore provided each with a gear E loosely located thereon above the bearing in arm $d$, which gears E E are engaged by the worms $a^2$ $a^2$ on the horizontal shaft $a$.

Although the gears E E are loose upon the screw-shafts $c$ $c$, yet they are adapted to be clamped thereto by means of a device consisting of a crank-handle K, the end of which is formed as a collar, which surrounds the screw $c$ and has a feathered connection therewith, it being also provided with projections $k$ $k$, extending downward and adapted to enter recesses in the upper portion of the gear-wheel E. Thus it will be seen that the handle K may occupy the position shown in full lines in Fig. 6, or may be dropped into the position shown in dotted lines. When it occupies the position shown in full lines, it is held there by means of suitable set-screws, and when in that position the rotation of the shaft $a$ will not move the screw $c$, but will simply revolve the gear E loosely upon said screw-shaft; but when the handle K occupies the position shown in dotted lines then it will serve to clutch the gear E tightly to the screw-shafts, so that as the horizontal shaft $a$ revolves the screw-shafts $c\ c$ will likewise be revolved, and the effect of the revolution of these shafts will obviously be to raise or lower the sliding plate B. The parts are so adjusted that when the clutch-handles K K have both been dropped into the position where they serve to connect the gears E E to the shafts $c\ c$ the effect of the revolution of the screws $c\ c$ will be to draw down the sliding plate B, and thus feed the saw forward to its work and into and through the same. Then when it is desired to retract the saw from its work the customary way will be to lift the handles K K into the positions shown in Fig. 1, and by rapidly manipulating them by hand the sliding plate can be lifted into its former position, after which the loose gears E E can again be clutched to the screw-shafts and the work proceed as before. Thus it will be seen that the plate B can be actuated by hand for the quick retracting or back motion and can be actuated by the worm and pinion for the slow motion required for the feed in cutting.

In connection with the actuating mechanism, I have also devised the boring appliances, whereby the rail or other object that may be operated upon may be bored or drilled simultaneously with being cut. J J denote two drills located in the face of the main frame, as shown in Fig. 2. These drills are revolved by the following mechanism. On the horizontal shaft are located the bevel-pinions $g\ g$, which engage other bevel-pinions $f\ f$ at right angles to the first, the latter pinions being upon the upper ends of shafts F F, carried in bearings in the horizontal arms $h\ h$, projecting from the plate B. The lower ends of these shafts F F are received into hollow tubes or sleeves G G, which tubes or sleeves G G have bearings in the horizontal arms $h'\ h'$, projecting from the main frame A. Said sleeves, furthermore, are provided on their lower ends with bevel-pinions H, which engage bevel-pinions I, located on the drills themselves.

It will be noted that as the plate B moves up and down the shafts F F will move up and down within the sleeves G G. Thus these shafts F and sleeves G constitute extensible shafts, which accommodate themselves to the varying positions of the adjacent mechanism; hence the rotation of the shaft $a$ will, through the agency of the intervening mechanism just described, serve to rotate the drills J J and cause them to act upon the work which they are designed to drill or bore.

It now remains to describe the way in which these drills are fed forward and into the work upon which they act. The sliding plate B is provided with a downwardly-extending vertical strip of metal of suitable width and shape M, a portion of which M' is inclined. This inclined portion passes through a slot in the horizontal yoke L, which is provided with tubular sockets L' L', that receive the drills. (See Fig. 7.) It will be evident that as the plate B descends the inclined part M' of the metallic strap will act as a cam or wedge, forcing the yoke L horizontally toward the railroad-rail or other work, and thus pressing the drills, which are carried by said yoke, likewise against their work. On the other hand, when the plate B is lifted, the effect of the inclined strip M' acting as a cam will be to throw the drills in the other direction and remove them from their work.

I have described here two drills. One drill, however, might be used, or more than two. The number is immaterial and may vary as desired.

I do not wish to confine myself to any special form of drilling mechanism for holding the work while it is being operated upon; but I have shown one form consisting of a handle N, carrying a cam $m$, which cam is pivoted in the lower portion of the main frame and is adapted to act upon the shank of a presser-block O, which block during the manipulation of the handle N will be forced tightly against the rail.

It will thus be seen that I have provided a machine especially adapted for use of power. Any kind of a cutting device and any kind of a cutter-operating device can be employed in connection with the mechanical parts herein shown for driving the same. I do not wish, therefore, to be restricted to the particular construction and arrangement of mechanical elements herein specified, but reserve the liberty of varying the same to suit the circumstances of individual cases.

The saw and the means for operating the same, which have been described in the foregoing specification, are not claimed in this case, as they are embraced in the claims of another application for patent, filed May 11, 1889, Serial No. 310,421.

Having thus described my invention, what I claim as new, and desire to secure by Letters Patent, is—

1. In a machine for sawing metals or other substances, the combination of the main frame, the vertically-sliding plate thereon, the horizontal shaft carried by said plate and suitably actuated by some convenient power, and the vertical screw-shaft engaging nuts on the main frame and engaged by worms on the horizontal shaft, whereby the sliding shaft is moved, substantially as described.

2. In a machine for sawing metals or other substances, the combination of the main frame, the vertical sliding plate thereon, the horizontal shaft carried by said plate, having a pulley and a saw-actuating wheel, the saw likewise carried by the plate, and the vertical screw-shafts engaging nuts on the main frame and arms on the sliding plate and being engaged by worms on the horizontal shaft, all substantially as described.

3. In a machine for sawing metals or other substances, the combination of the main frame, the vertically-sliding plate thereon, the horizontal shaft carried by said plate and suitably actuated by some convenient power, the vertical screw-shafts engaging nuts on the main frame and loosely connected to projecting arms on the sliding plate, the loose pinions on said screw-shafts, which are engaged by worms on the horizontal shaft, and the clutch-handles for connecting said loose pinions to the screw-shafts and for operating the latter for quick motion, substantially as described.

4. In a machine for sawing metals or other substances, the combination of the main frame, the vertically-sliding plate thereon, the horizontal shaft carried by said plate and suitably actuated by some convenient power, said shaft being provided with pinions $g\ g$, the vertical screw-shafts engaging nuts on the main frame and engaged by worms on the horizontal shaft, the drills having pinions thereon, and the extensible shafts provided with pinions at the upper and lower ends thereof, whereby motion is communicated from the horizontal shaft to the drills, substantially as described.

5. In a machine for sawing metals or other substances, the combination of the main frame, the vertically-sliding plate thereon, the horizontal shaft carried by said plate and having worms and pinions thereon, the vertical screw-shafts engaging nuts on the main frame and arms on the sliding plate, and being engaged by the worms on the horizontal shaft, the horizontal drills, the extensible vertical shafts having pinions that engage the pinions on the horizontal shaft and also that engage pinions on the drills, the wedging-cam connected to the sliding plate, and the slotted yoke that receives the drills and is actuated by said wedging-cam, all substantially as described.

6. The combination of the main frame, sliding plate, horizontal drive-shaft thereon, vertical screws for operating the plate, the drills geared to the drive-shaft, the wedge-cam carried by the sliding plate, and the slotted yoke receiving the drills and acted on by the said wedge-cam, substantially as described.

In testimony whereof I affix my signature in presence of two witnesses.

WILBERFORCE B. HAMMOND.

Witnesses:
JAS. A. MILLER,
HOMER ALBERS.